United States Patent
Yang et al.

(10) Patent No.: US 7,688,744 B2
(45) Date of Patent: Mar. 30, 2010

(54) BROADBAND TEST LINE ACCESS CIRCUIT, BROADBAND TEST-LINE ACCESS BOARD AND BROADBAND TEST DEVICE

(75) Inventors: Tao Yang, Shenzhen (CN); Jun Zhou, Shenzhen (CN); Zhiguo Yan, Shenzhen (CN); Ruijie Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 11/570,998

(22) PCT Filed: Jul. 20, 2005

(86) PCT No.: PCT/CN2005/001078

§ 371 (c)(1),
(2), (4) Date: Dec. 20, 2006

(87) PCT Pub. No.: WO2006/007790

PCT Pub. Date: Jan. 26, 2006

(65) Prior Publication Data

US 2008/0298262 A1     Dec. 4, 2008

(30) Foreign Application Priority Data

Jul. 22, 2004    (CN) .................. 2004 1 0054821

(51) Int. Cl.
*G01R 31/08*     (2006.01)
(52) U.S. Cl. .................. 370/249; 370/241; 370/242; 370/248; 370/357; 370/360

(58) Field of Classification Search .............. 370/241, 370/242, 248, 249, 252, 351, 357, 360; 385/15
See application file for complete search history.

(56) References Cited

U.S. PATENT DOCUMENTS 6,477,249 B1 *    11/2002    Williamson et al. ..... 379/399.01

(Continued)

FOREIGN PATENT DOCUMENTS

CN      1283345      2/2001

(Continued)

OTHER PUBLICATIONS

Mandato, D., "Presentation; Concepts of Service Adaption, Scalability, and QoS Handling on Mobility Enabled Networks", IST Mobile Communication Summit (Sep. 10, 2001), pp. 1-16.

(Continued)

*Primary Examiner*—Ricky Ngo
*Assistant Examiner*—Paul Masur
(74) *Attorney, Agent, or Firm*—Finnegan, Henderson, Farabow, Garrett & Dunner LLP (57) ABSTRACT

A broadband test line-access board includes at least two broadband test line-access units. Each of the at least two broadband test line-access units includes first, second, and third test terminals, a signal splitter, first, second, and third switches, and first second and third interface terminals. The broadband test line-access board further includes a set of inner test buses, including an internal inner-test bus, an internal outer-test bus and an internal auxiliary-test bus, and fourth, fifth, and sixth switches, and a low-pass filter.

7 Claims, 4 Drawing Sheets

U.S. PATENT DOCUMENTS

| | | |
|---|---|---|
| 6,515,972 B1 | 2/2003 | Gage |
| 6,549,610 B2 * | 4/2003 | Kikui ..................... 379/29.01 |
| 6,594,343 B1 | 7/2003 | Duffie et al. |
| 2003/0147507 A1 | 8/2003 | Wang et al. |
| 2005/0058390 A1 * | 3/2005 | Iwai ........................... 385/15 |

FOREIGN PATENT DOCUMENTS

| | | |
|---|---|---|
| CN | 1398123 | 2/2003 |
| CN | 1435059 | 8/2003 |
| GB | 2 393 354 | 3/2004 |

OTHER PUBLICATIONS

European Search Report from corresponding PCT Application No. PCT/CN2005/001078; mailed Feb. 11, 2008, 8 pages.

* cited by examiner

BROADBAND TEST LINE ACCESS CIRCUIT, BROADBAND TEST-LINE ACCESS BOARD AND BROADBAND TEST DEVICE

FIELD OF THE INVENTION

The present invention relates to the field of electronic techniques, and in particular to a broadband test line-access and protection device.

BACKGROUND OF THE INVENTION

Since the xDSL (Digital Subscriber Line) technology came to the world, it has been deployed worldwide because it can provide broadband services through conventional resources of copper lines so as to effectively protect the investments of operators and to provide broadband services for the subscribers. In the xDSL family, the personal user-oriented ASDL (Asymmetric Digital Subscriber Line), which targets the residential service, has an absolute dominance in broadband access applications for personal users because it is very suitable for the asymmetric characteristic of traffics for personal broadband access services, that is, the amount, of data from a Central Office (CO) to a Customer Premise Equipment (CPE) (called the downlink direction) is much greater than that of the uplink direction (from the CPE to the CO). At present, multimedia services provided by ADSL, such as a high-speed network access, a video service and the like, has been utilised widely, and the ADSL services and the Plain Old Telephone Services (POTS) have together become important services provided by the Public Switched Telephone Network (PSTN). Furthermore, with an increasing demand of the users for access bandwidths, the access technology of VDSL (Very-high Digital Subscriber Line) will be applied which is capable of providing a higher bandwidth and a more flexible distribution of uplink and downlink bandwidths.

Figure 1:
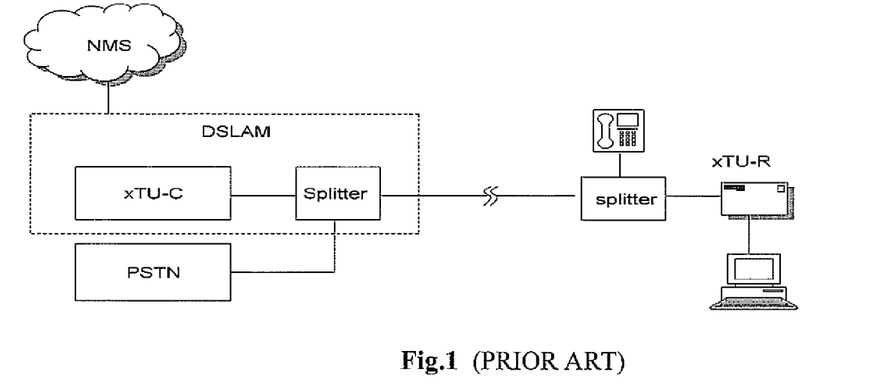
FIG. 1 is a schematic diagram illustrating a model of an xDSL system.

The ADSL and the VDSL utilize a higher frequency band above the conventional band for telephone signals (below 3.4 KHz). Here, the band for the ADSL ranges from 25.875 KHz to 1.104 KHz, the band for the ADSL2+ ranges from 25.875 KHz to 2208 KHz, and the VDSL may use the band of 25 KHz to 30 MHz. An xDSL signal and a POTS signal may be mixed and transmit over the same telephone line simultaneously since they utilise different frequency bands, and a simple filter can be adopted to separate xDSL and POTs signal from mixed signals. For the ADSL and the VDSL, such a filter is also called a splitter, and the output of the splitter is a POTS service signal is split from, that is, an output of the splitter is connected with the PSTN. An equipment providing in a centralized manner a plurality of ADSL and VDSL services within a communication network is called a DSL Access Multiplexer (DSLAM). A reference model for the ADSL and the VDSL system is shown in FIG. 1. Here, the output of the DSLAM may be connected to a conventional telephone and an xTU-T (xDSL Transmission Unit-Remote) respectively, an xTU-C (xDSL Transmission Unit-Central) is provided in the DSLAM, and the DSLAM is also connected with, a Network Management System (NMS).

As the application scale of the xDSL expands sharply, the system maintenance becomes increasingly important. The requirement of the xDSL for transmission lines is much higher than that, of the POTS, since the xDSL service utilizes a higher hand than the POTS service. In addition, the twisted pair line was originally designed for the POTS service, so not all the lines capable of providing a telephone service may be suitable for the xDSL. Furthermore, the corresponding PSTN equipments become more complicated due to the terminals of the DSLAM and the xDSL. Therefore, the provisions of a fault analysis and positioning system as well as means far the system maintenance are very important.

An automatic test system for an xDSL system mainly includes a line-access device and a test circuit. The automatic test system for an xDSL system generally provides the test functions including a test for a central office unit (i.e., an xTU-C), a test for an xDSL remote unit (i.e. an xTU-R) and a test for a line. The central office unit, the line and the remote unit have to be switched onto the test system (i.e., the test circuit) respectively in order to carry out the above respective test functions. This process of switching is called line-access. Taking the central office unit as a reference, the test for the central office unit is called an inner-test, and the test for the line and the remote unit is called an outer-test. Another test is to monitor an xDSL line which works normally without any influence on normal operations of the xDSL service and the POTS service.

In general, there are two sets of buses for use in an automatic test system for a DSLAM, one of which is called an inner-test bus, and the other of which, is called an outer-test bus. The so-called line-access is actually a process for connecting a port to be test onto the outer-test or inner-test bus. Since a POTS service is also carried on an xDSL line, the line-access in the test process should influence the narrowband POTS service as least as possible. Furthermore, in view of a line renting relationship between the Incumbent Local Exchange Carriers (ILECs) and the Competitive Local Exchange Carriers (CLECs) in some countries (a CLEC may rent a line of an ILEC for providing a broadband service, and the ILEC also provides a POTS service on the same line), and some ILECs may have their own narrowband test apparatus, in this case, when the ILEC tests a line, the broadband portion should be able to be bypassed without any influence thereupon.

In addition, in order to improve the service transmission quality for a communication system, it is necessary to provide a backup mechanism for a port in the communication system, so a switching can be performed onto a backup port when the corresponding port-fails, so as to ensure that a communication service will not be interrupted.

Function modules for implementing the above test line-access and backup functions are generally implemented by a relay matrix connected in the transmission line. The use of numerous relays may increase the implementation cost and also the area of a corresponding Printed Circuit Board (PCB), which results in a reduced port density. Therefore, it is impossible to meet the requirements for the broadband communication and the test.

SUMMARY OF THE INVENTION

In view of the above, embodiments of the present invention provide a broadband test line-access and protection device so as to provide a reliable test line-access and built-in protection function with low cost.

Embodiments of the present invention provide the following solutions.

An embodiment of the present invention provides a broadband test line-access unit, comprising a first test terminal, a second test terminal, a third test terminal, a signal splitter; a first switch, a second switch, a third switch, a first interface terminal, a second interface terminal and a third interface terminal, wherein the first test terminal, the second test terminal and the third test terminal are connected together to form a common terminal; normally-closed contacts of the first switch, the second switch and the third switch are connected in series respectively in lines between the common terminal and the first test terminal, the second test terminal and the third test terminal, and normally-opened contacts of the first switch, the second switch and the third switch are connected respectively to the first interface terminal, the second interface terminal and the third interface terminal; and the signal splitter is connected in series between the common terminal and the normally-closed contact of the third switch.

Another embodiment of the present invention provides a broadband test line-access board, based on the broadband test line-access unit, comprising:

at least two broadband test line-access units, a set of internal test buses, a fourth switch, a fifth switch and a sixth switch, wherein the set of internal test buses comprises an internal inner-test bus, an internal outer-test bus and an internal auxiliary-test bus; the first interface terminal, the second interface terminal and the third interface terminal of each broadband test line-access unit are connected respectively to the internal inner-test bus, the internal outer-test bus and the internal auxiliary-test bus; and the fourth switch, the fifth switch and the sixth switch are connected in series respectively between the internal inner-test bus and the internal outer-test bus, between the internal inner-test, bus and internal auxiliary-test bus and between the internal outer-test bus and the internal auxiliary-test bus.

A further embodiment of the present invention provides a broadband test device based on the broadband test line-access board, comprising: at least one broadband test line-access boards, an eighth switch, a ninth switch, a test control module, and an external inner-test bus and an external outer-test bus connected to the test control module, wherein the external inner-test bus and the external outer-test bus are connected to the internal inner-test bus and the internal outer-test bus via the eighth switch and the ninth switch, respectively.

A further embodiment of the present invention provides a low-pass filter for broadband test line-access through a set of inner test buses, comprising an internal outer-test bus, an internal inner-test bus and an internal auxiliary-test bus, the low-pass filter being arranged via a switch between the internal outer-test bus and the internal auxiliary-test bus or the internal inner-test bus.

For the broadband test device according to the embodiment of the present invention, when two or more broadband test line-access boards are connected on the external test buses, the external auxiliary-test bus among the external test buses is connected respectively to the internal auxiliary-test bus of each device via a relay. Moreover, the internal auxiliary-test bus of each device is connected to the internal inner-test bus via a relay.

With the broadband test device according to the embodiment of the present invention, in the case that a main board is damaged, and an inter-board backup is required, respective relays between the external auxiliary-test bus and the internal auxiliary-test buses of the main board to be protected and of the selected backup board are closed.

Furthermore, on the main board to be protected, the relay between the internal outer-test bus and the internal auxiliary-test bus is switched on, the relay between the internal outer-test bus and the customer end is switched on, and the relay between the plain telephone network and the internal auxiliary-test bus is switched on. On the selected backup board, the relays between the central office and the internal inner-test bus Test out and between the internal auxiliary-test bus and the internal inner-test bus are closed.

The relay provided between the internal outer-test bus and the internal auxiliary-test bus may be a relay connected directly between the internal auxiliary-test bus and the internal outer-test bus, or two relays between the internal auxiliary-test bus and the internal inner-test bus and between the internal inner-test bus and the internal outer-test bus.

It can be seen from the above that, an internal auxiliary-test bus is added in addition to the internal inner-test bus and the internal outer-test bus, and a low-pass filter is also utilized to isolate a broadband xDSL signal by use of characteristics of the xDSL signal. Thus, only three relays are used at each port to enable test functions including an inner-test, an outer-test, monitoring, a function with a broadband portion being bypassed when a PSTN initiates a test, a function with a busy/idle detection in which no detection is conducted when busy and no affect arises on a narrowband POTS service during a broadband test. According to the embodiments of the present invention, the test line-access function can be implemented for a plurality of ports within a board in a DSLAM system with a simple structure and low cost. Furthermore, both an inter-port N+1 backup function within a board and an inter-board N+1 backup-function can be implemented, thus improving the reliability of communication.

DETAILED DESCRIPTION OF THE EMBODIMENTS

Embodiments of the present invention are directed to implement a test line-access function respectively for a plurality of ports in a board. According to an embodiment of the present invention, respective broadband test line-access modules are provided respectively for the ports in the board. A set of broadband test line-access modules consisted of the broadband test line-access modules is connected in series internally and then is connected to a test control module. Furthermore, in order to ensure reliable communications of the ports, a corresponding port protection function can be implemented based on the set of broadband test line-access modules according to the embodiment.

Figure 4:
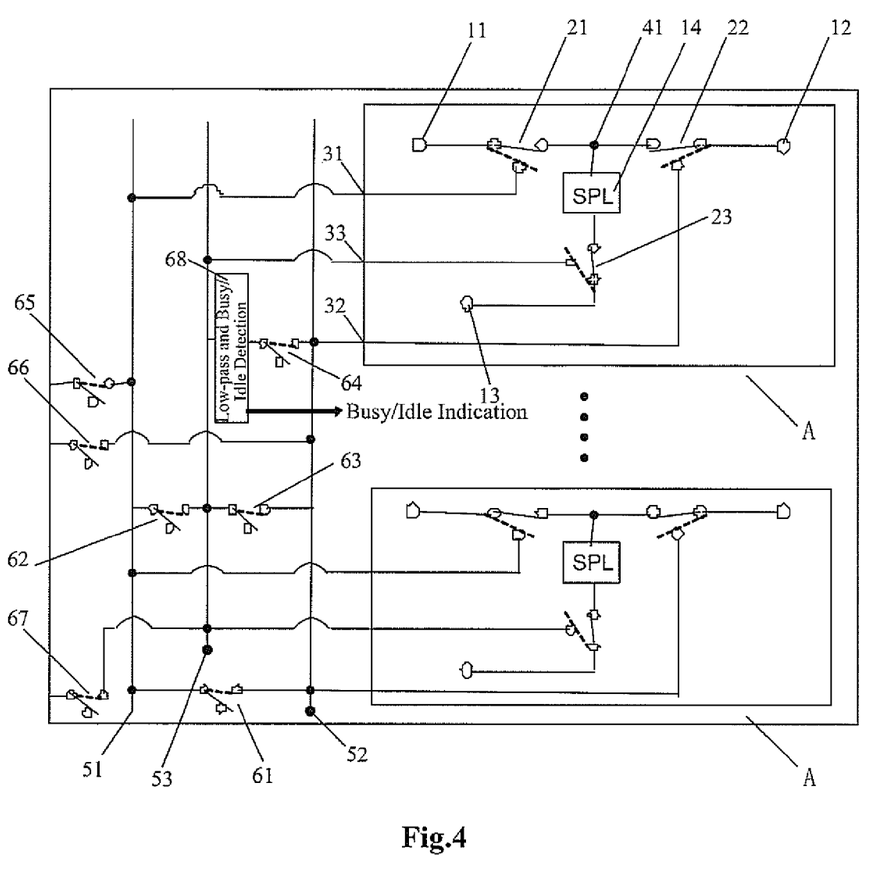
FIG. 4 is a schematic diagram illustrating the structure of a test line-access unit and a broadband test line-access board according to an embodiment of the present invention.

First referring to FIG. 4, A refers to a broadband test line-access unit including three test terminals, i.e., a first test terminal 11, a second test terminal 12, and a third test terminal 13, a signal splitter 14 (SPL as shown), a first switch 21, a second switch 22, a third switch 23, a first interlace terminal 31, a second interface terminal 32, and a third interface terminal 33. As shown, in FIG. 4, the first test terminal 11, the second test terminal 12 and the third test terminal 13 are connected together to form a common terminal 41. Each of the normally-closed contacts of the first switch 21, the second switch 22 and the third switch 23 is connected in series in a line between the common terminal 41, and a corresponding one of the first test terminal 11, the second test terminal 12 and the third test terminal 13, and the normally-opened contacts of the first switch 21, the second switch 22, and the third switch 23 are connected respectively to the first interface terminal 31, the second interface terminal 32, and the third interface terminal 33. The signal splitter 14 is connected in series between the common terminal 41 and the normally-closed contact of the third switch.

The first switch 21, the second switch 22 and the third switch 23 may be relays. In an alternative embodiment of the present invention, the switches may be electronic switches mainly consisted of transistors or an integrated circuit devices.

FIG. 4 also shows a broadband test line-access board based on the above broadband test line-access unit A, which is as shown including at least two broadband test line-access units A, a set of internal test buses, and a fourth switch 61, a fifth switch 62 and a sixth switch 63. The set of internal test buses includes an internal inner-test bus 51, an internal outer-test bus 52 and an internal auxiliary-test bus 53. In the figure, the first interface terminals 31, the second interface terminals 32 and the third interface terminals 33 in each broadband test line-access unit A are connected respectively to the internal inner-test bus 51, the internal outer-test bus 52 and the internal auxiliary-test bus 53. The fourth switch 61, the fifth switch 62 and the sixth switch 63 are connected in series respectively between the internal inner-test bus 51 and the internal outer-test bus 52, between the internal inner-test bus 51 and the internal auxiliary-test bus 53, and between the internal outer-test bus 52 and the internal auxiliary-test bus 53.

The broadband test line-access board shown in FIG. 4 also includes a low-pass filter unit 68 connected in series between the internal outer-test bus 52 and the internal auxiliary-test bus 53, and a seventh switch 64 connected in series between the internal outer-test bus 52 and the internal auxiliary-test bus 53. Additionally included in the low-pass filter unit is a busy-idle detection subunit. Practically, the busy-idle detection sub-unit may be present independently, that is, the busy-idle detection subunit and the low-pass filter unit may be provided in one unit and share a relay, or be separated from each other in a parallel state. As shown in FIG. 4, a further relay may be provided at such a side of the low-pass filter unit that is corresponding to the seventh switch 64, for the purpose of a necessary disconnection of the low-pass filter unit from the other circuits.

All the switches in FIG. 4 may be relays or otherwise electronic switches.

Figure 5:
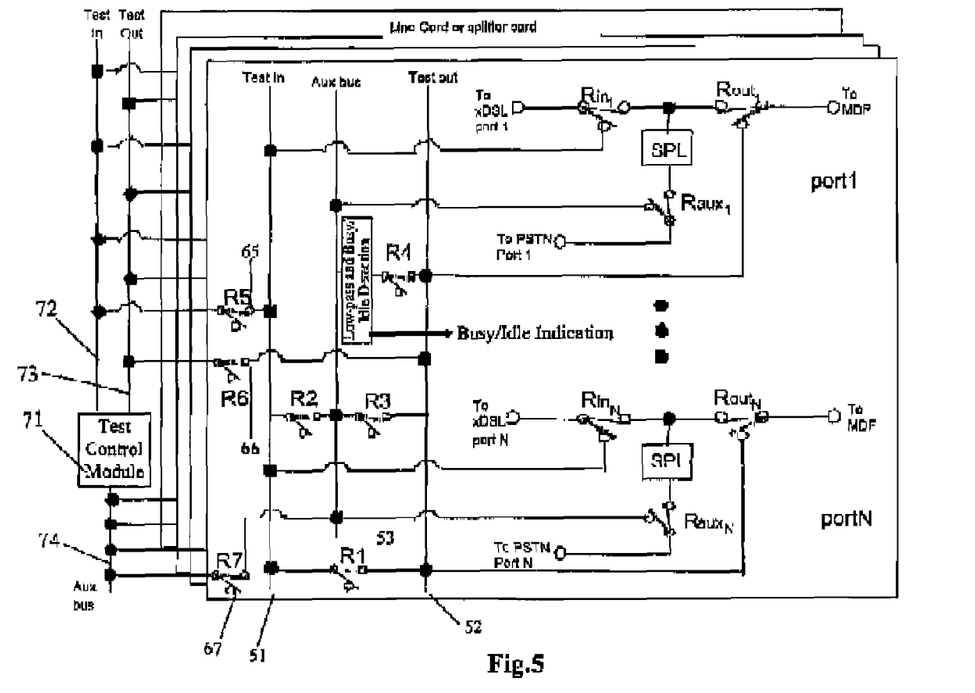
FIG. 5 is a diagram illustrating the structure of the broadband test device according to an embodiment of the present invention.

FIG. 5 shows a broadband test device based on the above broadband test line-access board including at least one broadband test line-access boards, an eighth switch 65, a ninth switch 66, a test control module 71, and also an external inner-test bus 72 and an external, outer-test bus 73 both connected with the test control module 71. The external inner-test bus 72 and the external outer-test bus 73 are connected to the internal inner-test bus 51 and the internal outer-test bus 52 via the eighth switch 65 and the ninth switch 66, respectively. The wide test device as shown in FIG. 5 also includes an external auxiliary-test bus 74 connected to the test, control module, and a tenth switch 67 connected in series between the external auxiliary-test bus 74 and the internal auxiliary-test bus 53. Alike, the switches in FIG. 5 may be relays or electronic switches.

Figure 2:
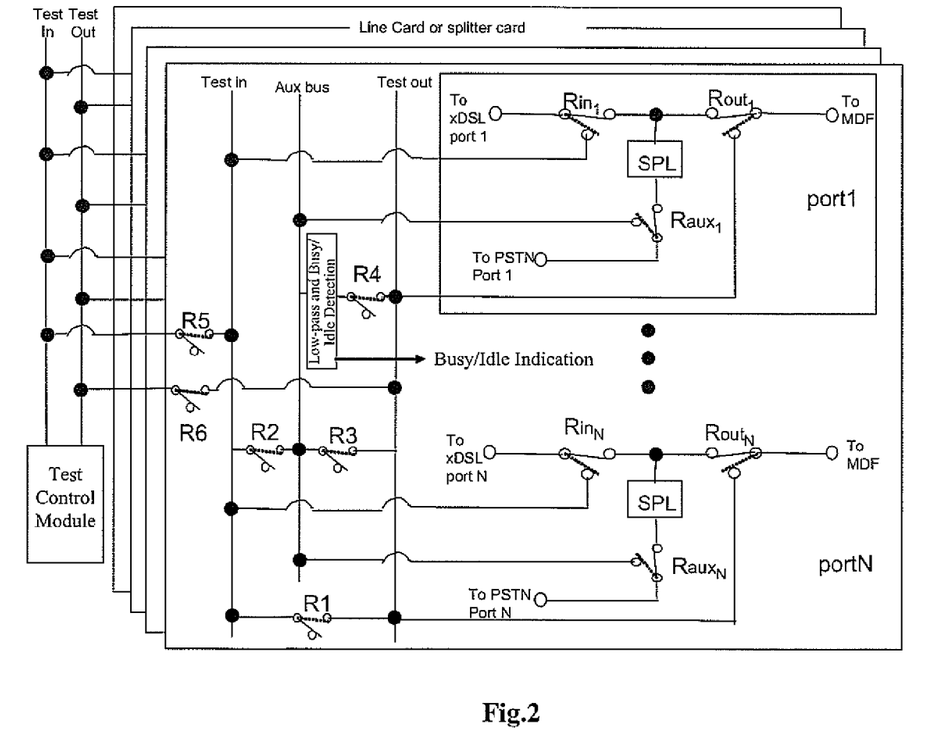
FIG. 2 is a schematic diagram illustrating the structure of a broadband test line-access and protection device with an in-board protection function.
Figure 3:
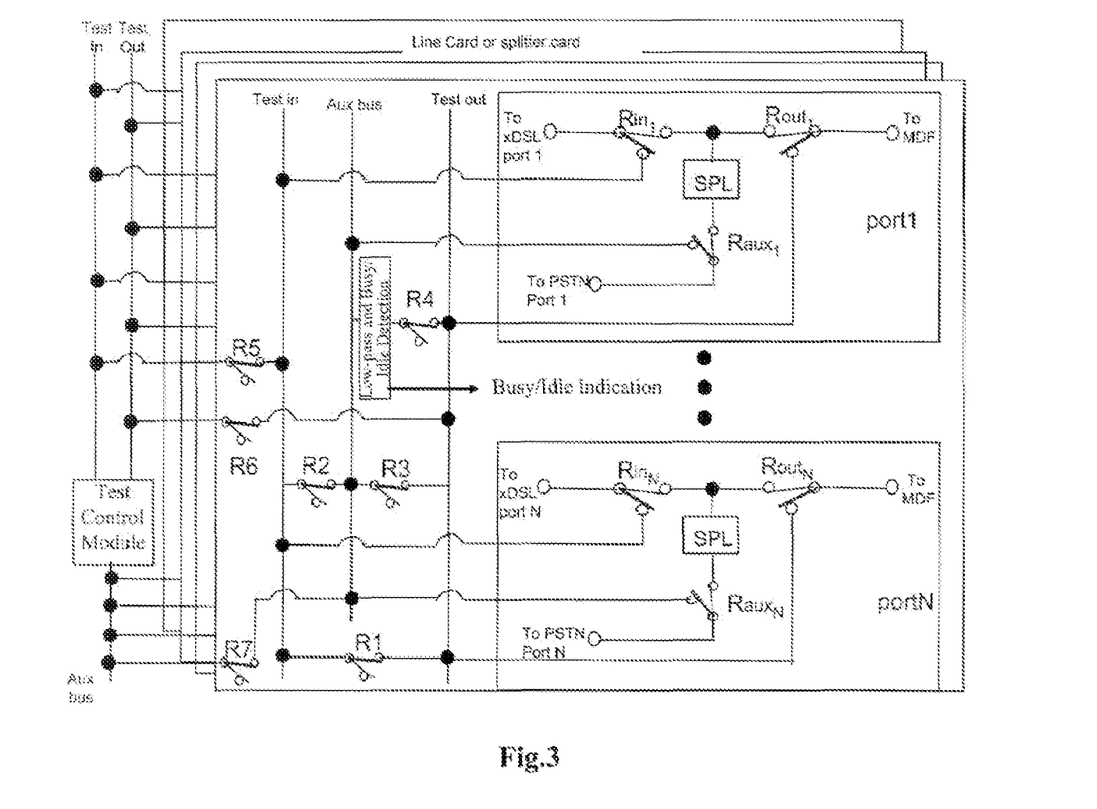
FIG. 3 is a schematic diagram illustrating the structure of a broadband test line-access and protection device with an in-board and inter-board protection function.

The devices as shown in FIG. 4 and FIG. 5 are actually of the forms as shown in FIG. 2 and FIG. 3, and will be further described with reference to FIG. 2 and FIG. 3.

In particular, the device as shown in FIG. 2 includes a set of broadband test line-access modules, relays and a low-pass filter module.

FIG. 2 is a schematic diagram illustrating a DSLAM system test bus as well as an internal test bus and a broadband test line-access module in one board. The system test bus is separated from the internal test bus within the board through relays R5, R6. It shall be noted that each bold black line in FIG. 2 represents a pair of transmission lines. The number of ports contained in the board is i taking a value of 1, 2, ..., N, where N represents a port number. In FIG. 2, each bold black solid line indicates an ON state of a normally-closed contact of a relay, i.e. a normal working state, and each thin broken line indicates an ON state of a normally-opened contact of a relay. As a result, a normally-closed state can ensure a normal operation of services in the case that the broadband test line-access module powers off.

The set of broadband test line-access modules according to this embodiment includes two or more broadband test line-access modules, the number of which is dependent upon that of the ports within the board, where each port corresponds to one broadband test line-access module. As shown in FIG. 2, N ports from port 1 through port N correspond to N broadband test line-access modules, each being connected with a set of internal test buses, and is connected to a central office xDSL, a user-end MDF and a plain telephone network PSTN associated with a corresponding port. The set of broadband test line-access modules is also connected to a test bus via a low-pass filter and a relay R4.

The internal test buses include:

an internal inner-test bus Test In, an internal outer-test bus Test Out and an internal auxiliary-test bus Aux Bus. Each of the broadband test line-access modules is connected with the test control module via these three buses.

Each broadband test line-access module includes:

a plurality of relays provided in transmission lines, where through On/Off states of the relays, the internal test buses are controlled respectively to be connected to the central office, the subscriber line and the PSTN. There are three relays, that is, a first one $Rin_1/Rin_N$ connected between a central office transmission line and an internal inner-test bus, a second one $Rout_1/Rout_N$ connected between an internal outer-test bus and a subscriber line, and a third one $Raux_1/Raux_N$ connected between an internal auxiliary-test bus and a PSTN transmission line.

Moreover, a relay R1 is provided between the internal inner-test bus and the internal outer-bus, both of which are connected to external inner-test and outer-test buses via relays R5, R6, respectively. The external test buses are connected to the test control module.

Each of the first, the second and the third relays $Rin_1/Rin_N$, $Rout_1/Rout_N$ and $Raux_1/Raux_N$ is a double-pole-double-throw relay, and via the splitter SPL, the third relay $Raux_1/Raux_N$ is connected in a direct connection path between the first relay $Rin_1/Rin_N$ and the second relay $Rout_1/Rout_N$. That is, the first relay $Rin_i$ is an inner-test line-access relay, the second relay $Rout_i$ is an outer-test line-access relay, and the third relay $Raux_i$ is an auxiliary relay. Each of the other relays R1-R6 is a double-pole-single-throw relay, and is opened during a normal service operation.

The low-pass filter module is connected in series with the relay R4, and then is connected between the internal auxiliary-test bus and the internal outer-test bus, and also built in the low-pass filter module is a busy-idle detection module, i.e., the low-pass and busy-idle detection module as shown FIG. 2, which detects whether a PSTN (Public Switched Telephone Network) service is present in a transmission line, and if present, no line-access test will be performer, otherwise a corresponding line-access test can be performed. In another word, there is no test upon being busy, so as to ensure no affect on the normal operation of the PSTN service.

In an embodiment of the present invention, for a PSTN service test, a relay R3 is provided additionally between the internal auxiliary-test bus and the internal outer-test bus, so as to switch the PSTN service to the internal outer-test bus and thus the custom premise through the subscriber line.

With the device constructed above according to the embodiment of the present invention, a test line-access operation can be carried out, and a redundancy function as to a failure of an in-board port fault can be enabled. Referring to FIG. 2 again, a particular implementation can be as following.

In the case, of line-access for an inner-test:

The first relay $Rin_1/Rin_N$ is switched in such way to couple the central office and the internal inner-test bus, and the relay R5 between the internal inner-test bus and the external inner-test bus is closed so as to switch the xTU-C (central office) port onto the inner-test bus. At this time, the splitter SPL and the PSTN are disconnected from the DSLAM port, but are still connected to subscriber line. Therefore, the POTS (Plain Old Telephone Service) service will not be affected.

In the case of line-access for an outer-test, that is, in the case of line-access for a high frequency signal test:

The relay R6 between the internal outer-test bus and the external outer-test bus, and the relay R4 connected in series with the low-pass filter module are closed. The second and the third relays $Rout_i$, $Raux_i$ are switched simultaneously connected in series with to couple the plain telephone network and the internal auxiliary-test bus and to couple the subscriber line and the internal outer-test bus. At this time, a narrowband signal is directed to an external line through the third relay $Raux_i$, the relay R4 and the second relay $Rout_i$. This will not be misjudged by the POTS system as a hook flash, since the action time of a relay is only several milliseconds. The subscriber line and the xTU-R (the custom end) are switched onto an external outer-test bus via the second relay $Rout_i$ and the relay R6. Although the PSTN service is still on the line, no outer-test high frequency signal will be affected by the PSTN service due to the present of the low-pass filter (LPF) connected in series with the relay R4. This design is very important particularly when a test circuit susceptible to the SPL, such as a circuit utilizing TDR (Time Domain Refection), FDR (Frequency Domain Reflection) or the like, is used, since the LPF can be designed as presenting very high impedance for a frequency band above the POTS. In addition, since the parameters of the LPF are known, its affect on a test result of TDR, FDR or the like can be calibrated in advance, so as to ensure a test precision of TDR and FDR.

In the case of line-access for a test of a narrowband low frequency parameter (i.e., a parameter of a POTS service signal):

The relay between the internal outer-test bus Test Out and the external outer-test bus Test Out directly connected with the test control module is closed. The relay R4 connected in series with the low-pass filter module is opened or closed dependent upon the test result of the busy-idle detection module, that is, closed when busy, and opened when idle. The second relay $Rout_i$ and the third relay $Raux_i$ are switched respectively connected in series with to couple the plain telephone network and the internal auxiliary-test bus Aux Bus and to couple the subscriber line and the internal outer-test bus Test Out.

If a narrowband low frequency parameter of an external line, such as DC voltage, (resistance, current, capacitance and the like, is tested, the PSTN switch has to be switched off thus affecting the PSTN service. Therefore, it is necessary to first detect whether the line is busy, that is, whether a PSTN service is in operation (e.g., an ongoing call), and no test will be conduct if busy. Accordingly, as shown in FIG. 2, in the case of line-access for a test of a narrowband low frequency parameter, it is necessary for the line busy/idle detection circuit (current detection) connected in series with the relay R4 to detect the busy/idle state of the POTS service. No test for the narrowband low frequency parameter will be conducted if busy. Otherwise, the relay R4 cans, disconnect the PSTN service, and the second relay $Rout_i$ is maintained at a normally-opened contact so as to couple the external line and the outer-test bus. At this time, the low frequency parameter can be tested, since the external line is actually a "clean" external line, and the test result will not be affected by the DSLAM and the PSTN at all.

In the case of line-access for monitoring:

The relay R1 is closed to couple the internal inner-test bus and the internal outer-test bus. The relays R5, R6 between the internal test bus and the external test buses are closed. The relay R4 connected in series with the low-pass filter module is closed. The first, the second and the third relays $Rin_i$, $Rout_i$ and $Raux_i$ are switched connected in series with to couple the internal inner-test bus, the internal outer-test bus and the internal auxiliary-test bus respectively to the central office, the subscriber line and the plain telephone network, that is, simultaneously switched to the normally-opened contacts. At this time, a broadband signal is coupled via the first relay $Rin_i$, the relay R1, the second relay $Rout_i$, and the relays R5, R6 couple the line to the test control module, i.e., to the test circuit capable of monitoring information such as spectrum on the line. A narrowband signal is coupled through the third relay $Raux_i$, the low-pass and busy/idle detection module including the LPF (Low Pass Filter) and the busy/idle detection circuit, the relay R4 and the second relay $Rout_i$.

In practice, the low-pass filter unit LPF can be connected between the internal inner-test and outer-test buses (Test In/Test Out) via a relay, or may connect a port of the splitter, which interfaces to the ADSL line module, and the external bus via a relay. Thus, it also provides a choice that whether the test affects a narrowband service during a broadband test. Alternatively, a broadband test can be performed without interrupting a narrowband service, simply by providing a path for the narrowband signal via the LPF in case of line-access. In particular, if it is required to test an external line without interrupting a narrowband signal, the relay connected in series with the LPF will first be switched on before line-access, and thus the narrowband signal can be coupled via the LPF, and the broadband signal can be blocked by the LPF. If it is required to test a "clean" external subscriber line, this means the external subscriber line are disconnect from everything in central office side, the relay connected in series with the LPF will be kept opened upon line-access.

In the case of line-access for a test of the PSTN (plain telephone network):

The relay R3 is switched to couple the internal outer-test bus and the internal auxiliary-test bus. The second and third relays $Rout_i$ and $Raux_i$ are switched respectively to couple the plain telephone network and the internal auxiliary-test bus Aux Bus, and to couple the subscriber line and the internal outer-test bus Test Out. That is, the second and third relays $Rout_i$ and $Raux_i$ are switched to the normally-opened, contacts, and the relay R3 is closed, to couple the PSTN directly to the external line, so as to implement the line-access function for the PSTN test.

In the case that an in-board port is damaged and in-board backup is necessary:

The relay R1 is closed to couple the internal inner-test bus and the outer-test bus, the relay R4 connected in series with the low-pass filter module is closed, and the first relay Rin$_i$ is switched to couple the central office and the internal inner-test bus.

As shown in FIG. 2, it can be supposed that a port i is damaged, and a backup port N is required to replace the port i while the narrowband portion remains unchanged, so as to implement a N+1 backup within the board, i.e., a port level protection function for an in-board port. An operation flow of the relays is that the relays R1, R4 are first closed, then the normally-opened contact of the relay Rin$_N$ is closed, and finally the normally-opened contacts of Raux$_i$ and Rout$_i$ are both closed simultaneously. In this way, the broadband signal of the port i is directed to the CPE from the DSLAM port N, via the first relay Rin$_N$, the relay R1 and the second relay Rout$_i$, and the narrowband signal is directed to the external line via the third relay Raux$_i$, the relay R4, the LPF and busy/idle detection circuit and the second relay Rout$_i$, and the narrowband signal of the port N keeps unchanged. Thus, the port i is backuped through the port N, without any change to the PSTN port numbers.

In an embodiment of the present invention, the N+1 backup for the whole system can be implemented through enable an external auxiliary-test bus to be added to the external test buses of the system and to be coupled via a relay to an internal test bus within the board. In another word, when two or more devices are connected on the external test buses, the external test buses can also include an external auxiliary-test bus coupled with an internal auxiliary-test bus within each device via a relay. Moreover, the internal auxiliary-test bus of each device is connected to an internal inner-test bus via a relay, as shown in FIG. 3. Thus, the backup function can be achieved between individual boards of the system, that is, a protection function can be provided for the whole line card.

A processing flow for an inter-board backup in the case that a main board is damaged will be described as follows:

Referring to FIG. 3, it shows an actual form of the device as shown in FIG. 5. The respective relays R7 between the external auxiliary-test bus Aux Bus connected directly to the test control module and the internal auxiliary-test buses Aux Buses of the main board to be protected and of a selected backup board are closed. The relays R7 are double-pole double-throw switches.

In addition, relevant relays of the main board to be protected and of the selected backup board are also operated as follows.

On the main board to be protected, (1) the relay between the internal auxiliary-test bus Aux Bus and the internal outer-test bus Test Out is switched on. This relay between the internal auxiliary-test bus Aux Bus and the internal outer-test bus Test Out of the main board to be protected may be the relay R3 between the internal auxiliary-test bus Aux Bus and the internal outer-test bus Test Out, or may be the relays R2, R1 between the internal auxiliary-test bus Aux Bus and the internal inner-test bus Test In, and between the internal inner-test bus Test In and the internal outer-test bus Test Out; (2) the relay between the internal outer-test bus Test Out and the subscriber line is switched on; and (3) the relay (i.e., the third relay) between the plain telephone network and the internal auxiliary-test bus Aux Bus is switched on.

On the selected backup board, (1) the first relay between the central office and the internal inner-test bus Test In is switched on, that is, switched to the normally-opened state; and (2) the relay R2 between the internal auxiliary-test bus Aux Bus and the internal inner-test bus Test In is closed.

Upon completion of the above described operations, a narrowband signal on the main board to be protected reaches the subscriber line and CPE sequentially via the third relay, the relay R3 and the second relay on the board, and a broadband signal on the main board to be protected reaches the internal auxiliary-test bus on the main board to be protected sequentially via the first relay R2 and the relay R7 on the backup board, and further reaches the subscriber line and CPE sequentially via the relay R3 and the second relay on the main board to be protected in turn.

It can be seen from the above that an inter-board N+1 protection function within the DSLAM system can be achieved according to the embodiments of the present invention.

The present invention has been described and illustrated by the embodiments of the present invention and the drawings. It shall be recognized by those skilled in the art that those embodiments and drawings are merely illustrative and not restrictive, that the present invention shall not be limited thereto, and that various modifications and variations can be made thereto in light of the descriptions and the drawings without departing from the spirit and scope of the present invention as defined by the accompanying claims.

What is claimed is:

1. A broadband test line-access hoard comprising at least two broadband test line-access units,
    each of the at least two broadband test line-access units comprising a first test terminal, a second test terminal, a third test terminal, a signal splitter, a first switch, a second switch, a third switch, a first interface terminal, a second interface terminal and a third interface terminal, wherein the first test terminal is connected through a normally-closed contact of the first switch to a common terminal, the second test terminal is connected through a normally-closed contact of the second switch to the common terminal, the signal splitter is connected to a normally-closed contact of the third switch and the common terminal, and normally-opened contacts of the first switch, the second switch and the third switch are connected respectively to the first interface terminal, the second interface terminal and the third interface terminal;
    the broadband test line-access board further comprising a set of inner last buses, wherein the set of inner test buses comprises an internal inner-test bus, an internal outer-test bus and an internal auxiliary-test bus; the first interface terminal, the second interface terminal and the third interface terminal of each broadband test line-access unit being connected respectively to the internal inner-test bus, the internal outer-test bus and the internal auxiliary-test bus; characterized in that
    said broadband test line-access board further comprises a fourth switch, a fifth switch, a sixth switch and a low-pass filter unit, wherein the fourth switch is adapted to connect the internal inner-test bus to the internal outer-test bus, the fifth switch is adapted to connect the internal inner-test bus to the internal auxiliary-test bus, and the sixth switch is adapted to connect the internal outer-test bus to the internal auxiliary-test bus through the low-pass filter unit.

2. The broadband test line-access board according to claim 1, wherein the low-pass filter unit comprises a busy/idle detection subunit.

3. The broadband test line-access board according to claim 1, wherein the switches are relays.

4. She broadband test line-access board according to claim 1, wherein the low-pass filter unit is connected in series between the internal outer-test bus end the internal auxiliary-test bus.

5. A broadband test device, comprising: the broadband test line-access board according to claim 1; at least one broadband test line-access board, seventh switch, an eighth switch, a test control module, and an external inner-test bus and an external outer-test bus connected to the test control module, wherein the external inner-test bus and the external outer-test bus are connected to the internal inner-test bus and the internal outer-test bus via the seventh switch and the eighth switch, respectively.

6. The broadband test device according to claim 5, further comprising an external auxiliary-test bus connected to the test control module, and a ninth switch connected in series between the external auxiliary-test bus and the internal auxiliary-test bus.

7. The broadband test device according to claim 5, wherein the switches are relays.

\* \* \* \* \*